A. C. JEWELL.
STILL.
APPLICATION FILED OCT. 23, 1917.
1,369,438.
Patented Feb. 22, 1921.
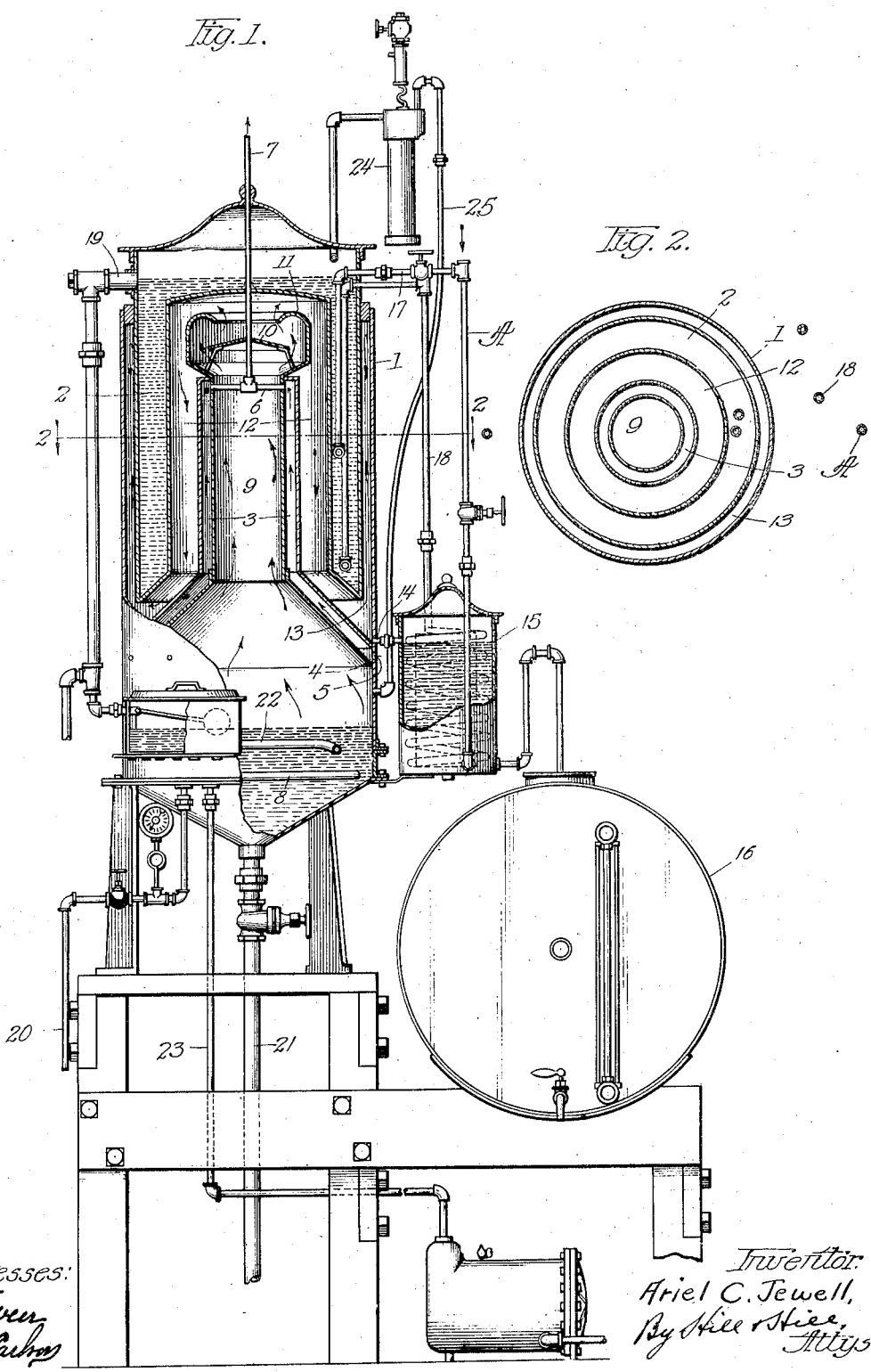
Witnesses:
Inventor:
Ariel C. Jewell,
By Hill & Hill,
Attys.

UNITED STATES PATENT OFFICE.

ARIEL C. JEWELL, OF CHICAGO, ILLINOIS.

STILL.

1,369,438.  Specification of Letters Patent.  Patented Feb. 22, 1921.

Application filed October 23, 1917. Serial No. 198,025.

*To all whom it may concern:*

Be it known that I, ARIEL C. JEWELL, a citizen of the United States, residing at Chicago, in the county of Cook and State of Illinois, have invented certain new and useful Improvements in Stills, of which the following is a description.

My invention belongs to that general class of devices adapted for use in the condensation of fluid from steam or vapor, and has for its object a device of the kind described which shall be economical in construction and rapid and effective in its operation.

To this end it broadly consists in placing a cooled air chamber within the still constructed to admit the air near the bottom thereof and escape of the air near the top of the chamber, thus by reason of the difference of the temperature of air admitted at the bottom securing a free movement thereof through the chamber. In the preferred form it consists further in constructing the air chamber substantially annular in form and so arranging it that the fluid in the still in passing therethrough will contact with both the interior and exterior of said chamber.

In the drawings, wherein like reference characters indicate like or corresponding parts, Figure 1 is a side elevation of the still and the preferred connecting parts coöperating therewith partly in section to more clearly illustrate the construction; and Fig. 2 is a transverse section therethrough on the line 2—2 of Fig. 1.

In the drawings, 1 indicates the outer wall of a preferably cylindrical still which has supported within it an annular water chamber 2. Within the central opening of the annular water chamber is arranged an annular air chamber 3, which is supported at its lower point, as at 4, to the walls of the still. A series of openings 5 admit air to the air chamber at or near the point where it is connected to the wall of the still. At or near the upper part of the air chamber I provide means for the escape of air from the said chamber to the exterior of the still. This may be done in any preferred manner. As shown, a pipe, or equivalent part 6 extends transversely from side to side of the air chamber near the upper part thereof, provided with an upward extension 7. As thus arranged, it will be readily seen that the air admitted at the lower part of the air chamber will be caused to rise by reason of the increasing temperature and escape through the pipe 7, thus insuring a free circulation through the air chamber and constituting the walls thereof air cooled condensing surfaces, while the walls of the water chamber 2 constitute water cooled condensing surfaces. A steam coil 8 at or near the bottom of the still supplies the steam or vapor to be condensed, which rising through the interior 9 of the air chamber, as indicated by the arrows, is deflected outward by the hood 10 and thence inward by the reverse hood 11, thence passing outside the air chamber through the annular chamber 12, thus being brought in contact with the air cooled condensing surface on one side, and the water cooled condencing surface on the other side. It is thence directed, as indicated by the arrows, around the lower end of the water cooled chamber as at 13, finally passing through the pipe or equivalent 14 of the cooler 15, from which point it may be conducted to the storage tank 16 in the usual manner. As indicated in the preferred construction, which we are describing, the water chamber may be supplied with cold water directly through the pipe 17, and in addition thereto may also be supplied through the pipe 18 arranged to conduct water directly from the cooler 15. As the condensing water fills the chamber it may be conducted therefrom by the overflow pipe 19 in the usual manner. 20 is a steam inlet and 21 a pipe connecting with the sewer. 22 is a scale and sediment flusher for the bottom part of the still. 23 is a pipe connecting with a suitable trap construction. 24 indicates an aerator provided with a pipe 25 arranged to conduct an air supply therefrom to the lower part of the still.

The operation of the device is apparent from the description given, the vapor being conducted through the flue 9 as stated contacts with the air cooled condensing surface of the water chamber, and after passing through the steam separator 10—11 is conducted through the chamber 12, which on one side is provided with an air cooled condensing surface and on the other with a water cooled condensing surface, and after circulating through the annular space between the outer wall of the still and the outer wall of the water chamber, finally collects at the bottom of the space and is conducted through the pipe 14 of the cooler as described.

Parts of the apparatus described are well known and have been in use heretofore. The important feature of this application consists in combining with a still of the nature described an air chamber preferably annular in form, which may be arranged to freely admit air at the bottom thereof, and as it rises by reason of the increase in temperature, permits its free escape near the top of the chamber, thus insuring a rapid circulation of air through the chamber as described. The air has no aerating action as it does not come into direct contact with the fluid, but passes directly through the annular chamber and escapes therefrom.

Having thus described my invention, what I claim as new and desire to secure by Letters Patent is:—

1. In a device of the character described, and in combination, a still having a central vapor chamber, an annular air chamber surrounding said vapor chamber, and means for normally permitting a continuous escape of air from the upper end of said air chamber, a water chamber surrounding the air chamber but spaced therefrom, said water chamber extending over the surface of the central vapor chamber, an annular vapor chamber arranged between the air chamber and the water chamber, means for admitting air near the bottom of the air chamber, and means for admitting water to the water chamber and to a receptacle in communication with the central vapor chamber.

2. In a device of the kind described and in combination, a still provided with a central vapor chamber, an inclosed annular water chamber inclosing the upper portion of the vapor chamber and surrounding the top thereof, an annular air chamber positioned between the vapor chamber and the water chamber, an annular vapor chamber arranged between the air chamber and the water chamber, means for admitting air near the bottom of the air chamber and permitting it to escape near the top thereof, and means for admitting water to the water chamber and drawing off the surplus therefrom.

3. In a device of the kind described, a central vapor chamber having suspended above it a deflector for deflecting the vapor therefrom outward and downward, an air cooled annular chamber surrounding the central chamber provided with means for admitting air near the bottom of the same and permitting its escape near the top, an inclosed annular water chamber arranged about the air chamber but spaced therefrom to provide a vapor passage, said water chamber overlying the top of the central vapor chamber, and means for admitting water to the water chamber and discharging the same therefrom.

4. In a device of the kind described, a central vapor chamber, a separator arranged above the chamber provided with a deflector whereby the water condensation and the vapor are separated, an annular air chamber arranged about the central chamber provided with means for admitting air near the bottom thereof and discharging means for the air comprising a transverse discharge pipe communicating with the air passage and extending through the central vapor chamber, and a vertically disposed conduit connected with said transverse pipe, an inclosed water chamber arranged about the air chamber but spaced therefrom to provide a vapor passage, and means for conducting water to the chamber and discharging the same therefrom.

In testimony whereof, I have hereunto signed my name in the presence of two subscribing witnesses.

ARIEL C. JEWELL.

Witnesses:
JOHN W. HILL,
CHARLES I. COBB.